United States Patent
Roh et al.

(10) Patent No.: US 9,405,428 B2
(45) Date of Patent: Aug. 2, 2016

(54) MOBILE TERMINAL AND MULTITASKING METHOD THEREOF

(71) Applicant: LG ELECTRONICS INC., Seoul (KR)

(72) Inventors: Hyeongseok Roh, Seoul (KR); Haksoo Kang, Seoul (KR); Taehyung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 454 days.

(21) Appl. No.: 13/706,306

(22) Filed: Dec. 5, 2012

(65) Prior Publication Data
US 2013/0145313 A1 Jun. 6, 2013

(30) Foreign Application Priority Data

Dec. 5, 2011 (KR) ........................ 10-2011-0129192

(51) Int. Cl.
| G06F 3/048 | (2013.01) |
| G06F 3/0481 | (2013.01) |
| G06F 3/0484 | (2013.01) |
| H04M 1/725 | (2006.01) |

(52) U.S. Cl.
CPC .......... *G06F 3/0481* (2013.01); *G06F 3/04817* (2013.01); *G06F 3/04845* (2013.01); *H04M 1/72552* (2013.01)

(58) Field of Classification Search
CPC .............. G06F 3/0481; G06F 3/04845; G06F 3/04817; H04M 1/72552
See application file for complete search history.

(56) References Cited

U.S. PATENT DOCUMENTS

| 5,694,561 | A | * | 12/1997 | Malamud | G06F 3/0481 715/805 |
| 5,737,507 | A | * | 4/1998 | Smith | G06F 3/0481 345/666 |
| 5,867,156 | A | * | 2/1999 | Beard | G06F 3/0481 715/753 |
| 5,995,103 | A | * | 11/1999 | Ashe | G09G 5/14 715/804 |
| 6,002,397 | A | * | 12/1999 | Jaaskelainen, Jr. | 715/805 |
| 6,232,957 | B1 | * | 5/2001 | Hinckley | G06F 3/03543 345/156 |
| 6,654,036 | B1 | * | 11/2003 | Jones | G06F 3/0481 715/788 |
| 6,710,790 | B1 | * | 3/2004 | Fagioli | G06F 3/0481 715/778 |
| 6,806,892 | B1 | * | 10/2004 | Plow et al. | 715/781 |

(Continued)

FOREIGN PATENT DOCUMENTS

EP 2224704 9/2010

OTHER PUBLICATIONS

European Patent Office Application Serial No. 12007652.6, Search Report dated Mar. 18, 2013, 6 pages.

*Primary Examiner* — Amy M Levy
(74) *Attorney, Agent, or Firm* — Lee, Hong, Degerman, Kang & Waimey; Jonathan Kang; Harry Lee

(57) ABSTRACT

Disclosed are a mobile terminal and a multitasking method thereof. In a state where a plurality of layers corresponding to a plurality of applications are displayed on a screen, a user performs an operation through an uppermost application. In this case, a search region of a preset shape through which a lower application can be directly visible is created on the uppermost application. This can allow the user to more rapidly and conveniently search for or select information provided from the lower application, and to apply the information to multitasking.

26 Claims, 22 Drawing Sheets

(56) References Cited

U.S. PATENT DOCUMENTS

| | | | | |
|---|---|---|---|---|
| 6,996,783 | B2* | 2/2006 | Brown | G06F 3/0481 715/768 |
| 7,992,087 | B1* | 8/2011 | Cameron | G09G 5/397 715/716 |
| 8,997,017 | B2* | 3/2015 | Stecher | G06F 3/0481 715/759 |
| 9,257,098 | B2* | 2/2016 | Eskolin | G06F 3/0488 |
| 2003/0142137 | A1* | 7/2003 | Brown | G06F 3/0362 715/786 |
| 2006/0206825 | A1* | 9/2006 | Dorn | G06F 3/0481 715/761 |
| 2006/0284852 | A1* | 12/2006 | Hofmeister et al. | 345/173 |
| 2008/0031488 | A1* | 2/2008 | Sato | G06T 11/60 382/100 |
| 2008/0195969 | A1* | 8/2008 | Brown | G06F 3/0486 715/802 |
| 2008/0256476 | A1* | 10/2008 | Seo et al. | 715/772 |
| 2009/0006991 | A1* | 1/2009 | Lindberg | G06F 3/04817 715/763 |
| 2009/0293062 | A1 | 11/2009 | Amir et al. | |
| 2010/0088628 | A1 | 4/2010 | Flygh et al. | |
| 2011/0035691 | A1* | 2/2011 | Kim | 715/765 |
| 2011/0239110 | A1* | 9/2011 | Garrett et al. | 715/256 |
| 2011/0283227 | A1* | 11/2011 | Moore | G06F 3/0481 715/800 |
| 2012/0124514 | A1* | 5/2012 | Yuniardi | G06F 3/048 715/802 |
| 2013/0290857 | A1* | 10/2013 | Beveridge | G06F 17/30899 715/740 |
| 2014/0013234 | A1* | 1/2014 | Beveridge | G06F 3/0484 715/740 |

\* cited by examiner

PHOTO ATTACHMENT

FIG. 7B
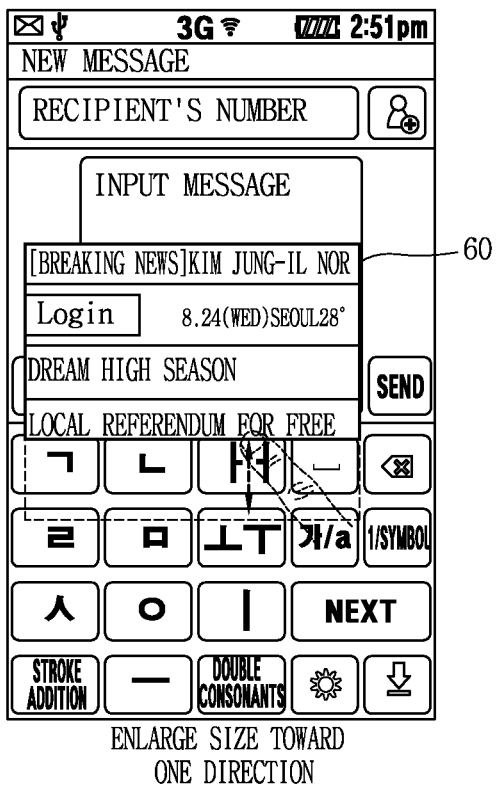
ENLARGE SIZE TOWARD
ONE DIRECTION
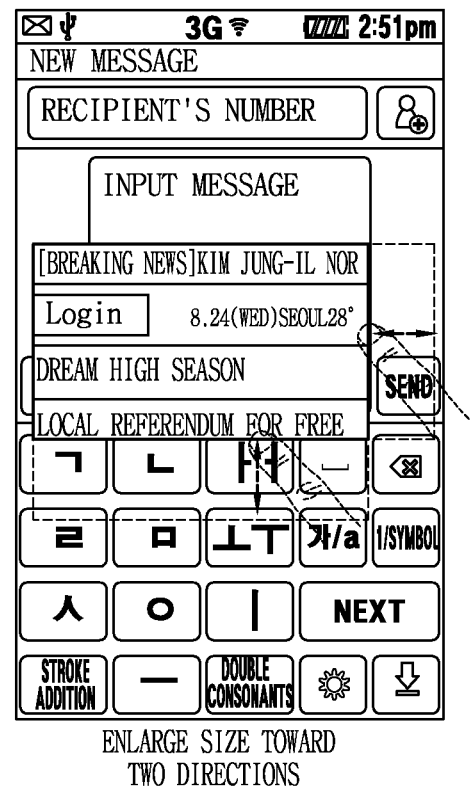
ENLARGE SIZE TOWARD
TWO DIRECTIONS FIG. 13
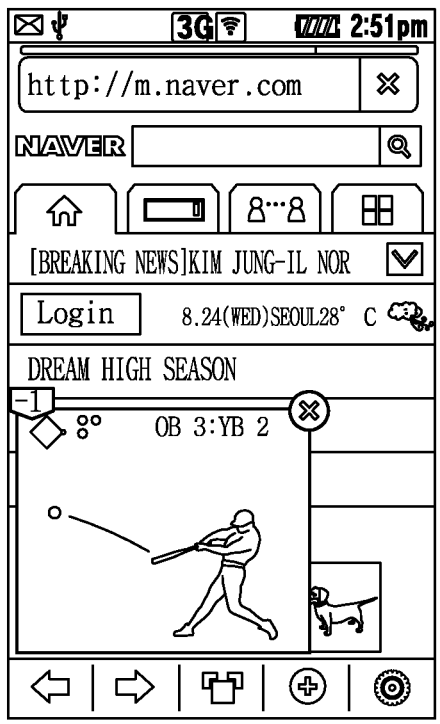
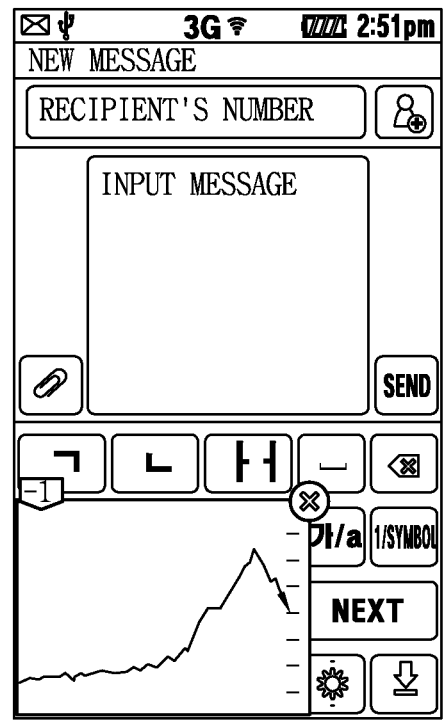
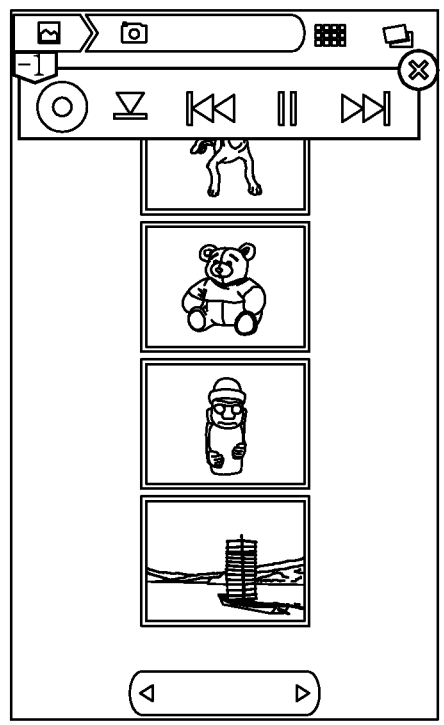

FIG. 16A
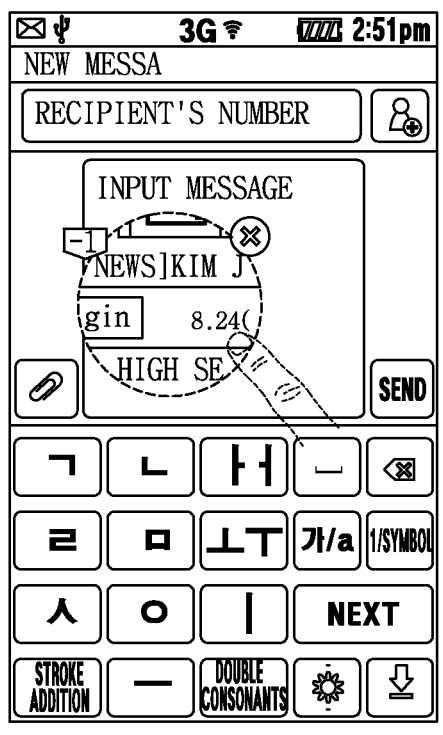  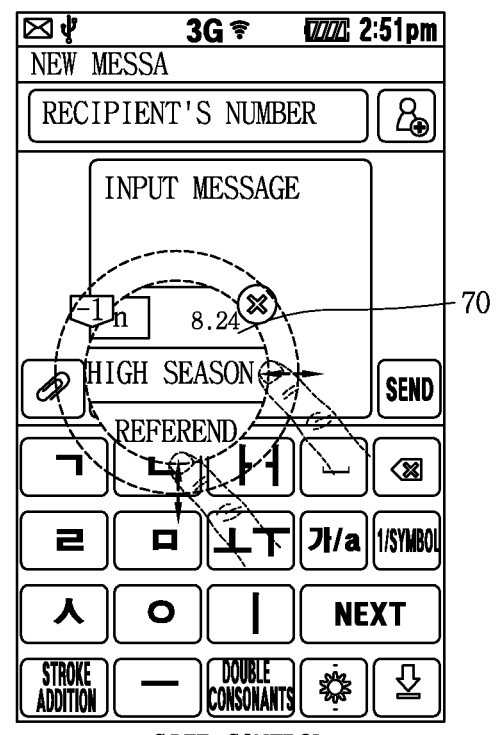
POSITION MOVEMENT → SIZE CONTROL

MOBILE TERMINAL AND MULTITASKING METHOD THEREOF

CROSS-REFERENCE TO RELATED APPLICATION

Pursuant to 35 U.S.C. §119(a), this application claims the benefit of earlier filing date and right of priority to Korean Application No. 10-2011-0129192, filed on Dec. 5, 2011, the contents of which is incorporated by reference herein in its entirety.

BACKGROUND OF THE INVENTION

1. Field of the Invention

The present disclosure relates to a mobile terminal, and particularly, to a mobile terminal capable of performing multitasking between application layers on a screen where a plurality of applications are hierarchically displayed, and a multitasking method thereof.

2. Background of the Invention

In general, a mobile terminal is configured to perform various functions. These various functions include video and voice call communications, still or moving images capturing using a camera, voice storing, music file reproducing through a speaker system, image or video displaying, etc. Some mobile terminals include additional functions such as playing games, and other mobile terminals are implemented as multimedia players. Moreover, recent mobile terminals are configured to allow a user to view video or television programs by receiving broadcasting or multicast signals.

Various attempts have been made to implement enhanced functions of the mobile terminal not only by structural improvements, but also by hardware or software improvements.

A touch function of the mobile terminal allows even a user having a difficulty in inputting buttons or keys to conveniently operate the mobile terminal, by using a touch screen. Recently, this touch function is considered as an important function of the mobile terminal, together with a User Interface (UI) as well as simple input. As the touch function is applied to the mobile terminal in various manners, developing a suitable UI is required more.

Generally, a user can perform multitasking on a screen where a plurality of applications are displayed. In this case, a firstly-selected application is displayed at the lower side, a secondly-selected application is displayed at the upper side, and a lastly-selected application or a currently-executed application is displayed at the uppermost side. The plurality of applications are displayed in a hierarchical manner, which is called an application layer.

In order for a user to use information of a second application disposed at a lowermost side while executing a first application disposed at an uppermost side, the second application is selected to be displayed on the uppermost side. Then, desired information is copied from the selected second application. Then, the first application is selected to be displayed at the uppermost side, so that the copied information can be disposed on a predetermined position of the displayed first application.

The conventional art may have the following problems.

When the use performs multitasking using the plurality of applications in a state that a plurality of selected applications are hierarchically displayed, it is difficult to move the applications, and to use information of the lower application. Such problems become severe as the number of application layers increases.

SUMMARY OF THE INVENTION

Therefore, an aspect of the detailed description is to provide a mobile terminal capable of facilitating movements of applications and capable of efficiently using information of the applications when performing multitasking in a state where a plurality of layers corresponding to a plurality of applications have been displayed, and a multitasking method thereof.

To achieve these and other advantages and in accordance with the purpose of this specification, as embodied and broadly described herein, there is provided a multitasking method of a mobile terminal, the method comprising: displaying an uppermost application on a screen while executing a plurality of applications; creating a search region of a preset shape on the uppermost application according to a touch input, the search region through which a lower application is visible; entering the lower application through the created search region; and applying information selected from the lower application to the uppermost application.

The plurality of applications may include an upper application which is in an activated state, and one or more lower applications which are in a deactivated state.

The search region may be a hole of a preset shape, the hole formed by a cutting function of a scissors icon displayed on the uppermost application.

Upon creation of the search region, a layer icon indicating each layer and a release button for releasing a corresponding layer may be created. And, the layer icon may be displayed on a predetermined region of the search region, or an additional icon region, or an object icon.

The search region may be a hole of a preset shape, the hole formed to be transparent centering around a touched point due to a spreading effect when the uppermost application is long-touched.

A size of the search region may be determined based on a shape formed by touch & drag of a scissors icon, or based on a touch time.

The method may further comprise: moving the lower application such that part to be searched is positioned within the search region; storing a position value of the moved lower application; and automatically displaying the previously-searched part on the search region, according to the stored position value, when the upper application is re-activated or re-created.

The lower application may be manually moved by a user's touch, or may be automatically moved according to a type of the uppermost application.

The method may further comprise: creating another search region of a preset shape on the search region, said another search region through which a subsequent lower application is visible; and entering the subsequent lower application through the created another search region, and applying information selected from the corresponding lower application to the uppermost application.

Upon creation of said another search region, layer icons may be displayed on a preset region of the search region, or an additional icon region, or an object icon like in the previous search region.

If the layer icons indicating the respective layers collide with each other, the screen may be divided such that applications of the layers are simultaneously displayed.

To achieve these and other advantages and in accordance with the purpose of this specification, as embodied and broadly described herein, there is also provided a mobile terminal comprising: a display unit configured to display an uppermost application on a screen while executing a plurality of applications; a memory configured to store therein the plurality of applications and display positions of the applications; and a controller configured to create a search region of a preset shape, on the uppermost application, according to a touch input, and configured to apply information selected from the lower application through the search region, to the uppermost application.

The search region may be a hole of a preset shape, the hole formed by a cutting function of a scissors icon displayed on the uppermost application.

Upon creation of the search region, the controller may create a layer icon and a release button for releasing a corresponding layer. And, the layer icon may be displayed on a predetermined region of the search region, or an additional icon region, or an object icon.

The search region may be a hole of a preset shape, the hole formed to be transparent centering around a touched point due to a spreading effect when the uppermost application is long-touched.

The controller may control a size of the search region based on a shape formed by touch & drag of a scissors icon, or based on a touch time.

The controller may be configured to store a position value of a lower application when the lower application has moved such that part to be searched is positioned within the search region, and configured to automatically display the previously-searched part, on the search region, according to the stored position value when the uppermost layer application is re-activated or re-created.

The lower application may be manually moved by a user's touch, or may be automatically moved according to a type of the uppermost application.

The controller may be configured to create another search region of a preset shape on the search region according to a touch input, said another search region through which a subsequent lower application is visible. And, the controller may be configured to apply information selected from the subsequent lower application to the uppermost application.

Upon creation of said another search region, the controller may display the layer icon on a predetermined region of the search region, or an additional icon region or an object icon like in the previous search region.

If two layer icons collide with each other, the controller may divide the screen such that applications of the layers are simultaneously displayed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 7A and 7B are views showing examples to move a search region or to control a size of the search region on an upper application;

FIG. 13 is a view showing an example to display a lower application through a search region;

FIGS. 16A and 16B are views showing examples to move a search region 70 created by a spreading effect, and to control a size of the search region;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV, a desktop computer, etc. It is assumed that the terminal of the present invention is a mobile terminal. However, it will be obvious to those skilled in the art that the present invention may be also applicable to the fixed terminal, except for specific configurations for mobility.

Figure 1:
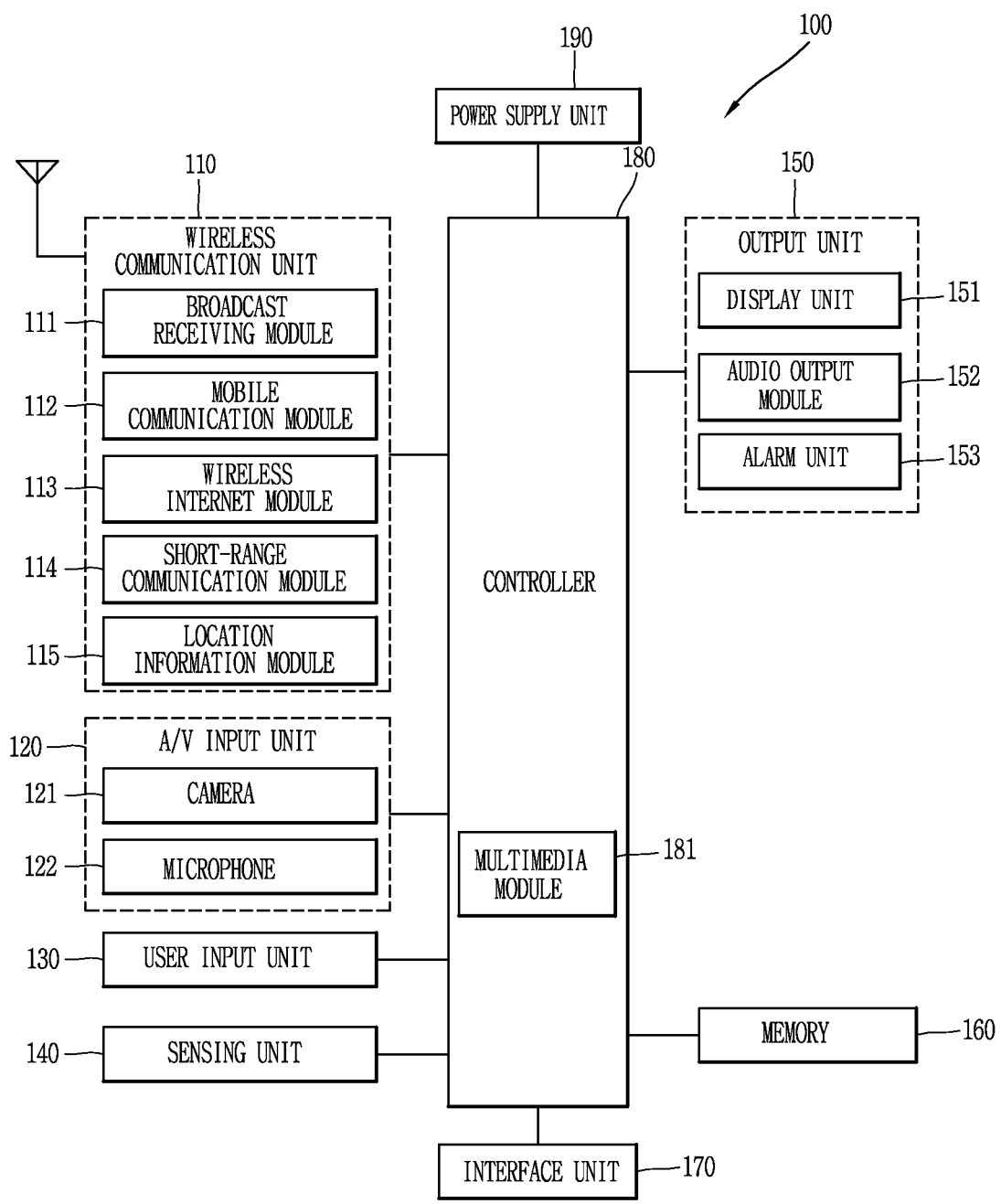
FIG. 1 is a block diagram of a mobile terminal according to a first embodiment of the present invention.

FIG. 1 is a block diagram of a mobile terminal according to an embodiment of the present invention.

As shown, the mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. The user's touch include proximity touch as well as touch, touch & drag, multi-touch, long touch and proximity touch.

The sensing unit 140 includes a geomagnetic sensor configured to calculate a moving direction when a user moves, a gyro sensor configured to calculate a rotation direction, and an acceleration sensor.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 of FIG. 1 may be configured to operate within a communication system which transmits data via frames or packets, including both wireless and wireline communication systems, and satellite-based communication systems. Such communication systems utilize different air interfaces and/or physical layers.

Hereinafter, a communication system where the mobile terminal of the present disclosure is operable will be explained with reference to FIG. 2.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 2:
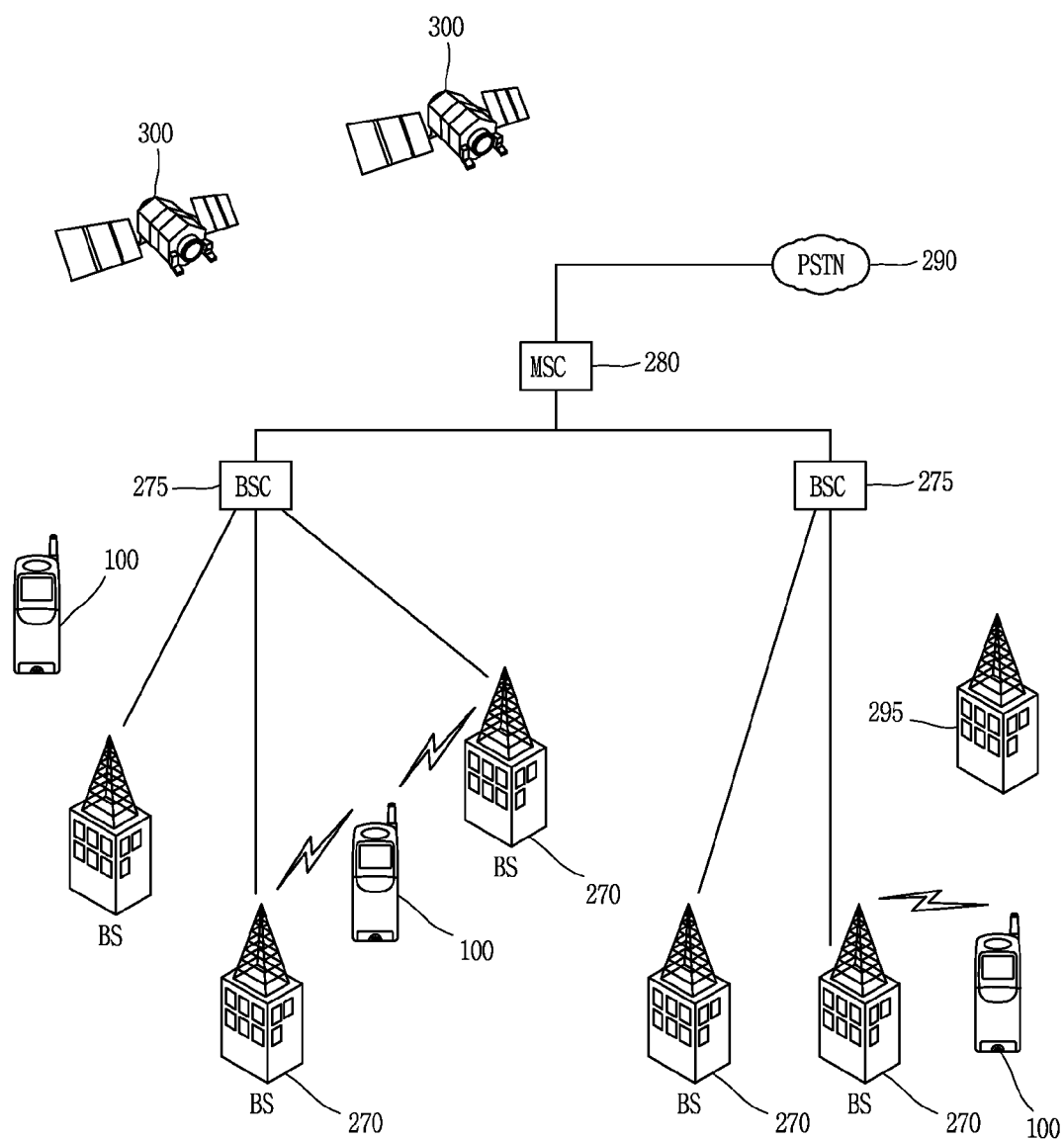
FIG. 2 is a block diagram of a radio communications system where a mobile terminal according to a first embodiment of the present invention can operate.

As shown in FIG. 2, a CDMA wireless communication system may include a plurality of mobile terminals 100, a plurality of base stations 270, a plurality of base station controllers (BSCs) 275, and a mobile switching center (MSC) 280. The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omni-directional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270. The base stations 270 may also be denoted as "cell sites." Alternatively, individual sectors of a given base station 270 may be referred to as cell sites.

As shown in FIG. 2, a broadcasting transmitter (BT) 295 transmits a broadcasting signal to mobile terminals 100 operating within the system. In addition, the broadcast receiving module 111 (FIG. 1) of the mobile terminal 100 is typically configured to receive broadcast signals transmitted by the DMB transmitter 295.

FIG. 2 further illustrates several global positioning system (GPS) satellites 300. Such satellites 300 facilitate locating the position of some or all of the mobile terminals 100. In FIG. 2, two satellites are shown, but positioning information may be obtained with greater or fewer satellites. In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications. In addition, each reverse-link signal received by a given base station 270 is processed within that base station 270, and the resulting data is forwarded to an associated BSC 275. The BSC 275 provides call resource allocation and mobility management functionality including soft handoffs between the base stations 270. Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In order for a user to perform multitasking, a plurality of layers corresponding to a plurality of applications are displayed on a screen according to a screen setting. An uppermost application (A) is an activated application through which an operation is actually performed. One or more lower applications are deactivated applications, that is, applications to be referred to for the operation. The applications are used to perform all types of functions of the mobile terminal, and have layers. In such hierarchical structure of applications, a user may search for required information (texts, photos and so on.) from a lower application while performing a desired operation using an application displayed on an uppermost layer, and then may use the searched information.

However, the conventional art may have the following problems.

In order to use information of lower applications while performing an operation through the upper application, the lower application is selected (activated) to be displayed on the upper application. Then, desired information is copied from the lower application, and the previous upper application is re-selected (activated) so that the copied information can be inserted or added to the re-selected (activated) upper application. As the upper or lower application is activated or deactivated, a display position of each application is changed. The reason is because an activated application and deactivated applications interwork with each other on a single screen.

In order to solve the conventional problem, the present invention provides a method for facilitating interwork and access between applications without selecting each application or changing a display position of each application, in case of performing multitasking in a hierarchical structure of the applications.

Furthermore, the present invention provides various embodiments for performing interwork and access between applications without changing a display position of each application in a hierarchical structure of the applications, and provides a user interface (UI) effective when performing interwork between applications in each embodiment.

In the present invention, performing interwork and access between applications without changing a display position of each application means entering lower applications in the following manners. As an example, part of the lower application is cut-out in the form of a hole. As another example, part or the entirety of the application is made to be transparent (spreading effect in the form of a hole). As yet another example, a user's finger sequentially passes through the lower applications as if the user's finger is put into water.

Displaying the applications means executing a function to move the lower applications and a magnifying glass function, in a moving mode and a magnifying mode. The display of the applications is determined by a touch time and a touch type. And, the determined display is identified on part of the screen, through various types of identification information, for a user's recognition.

Figure 3:
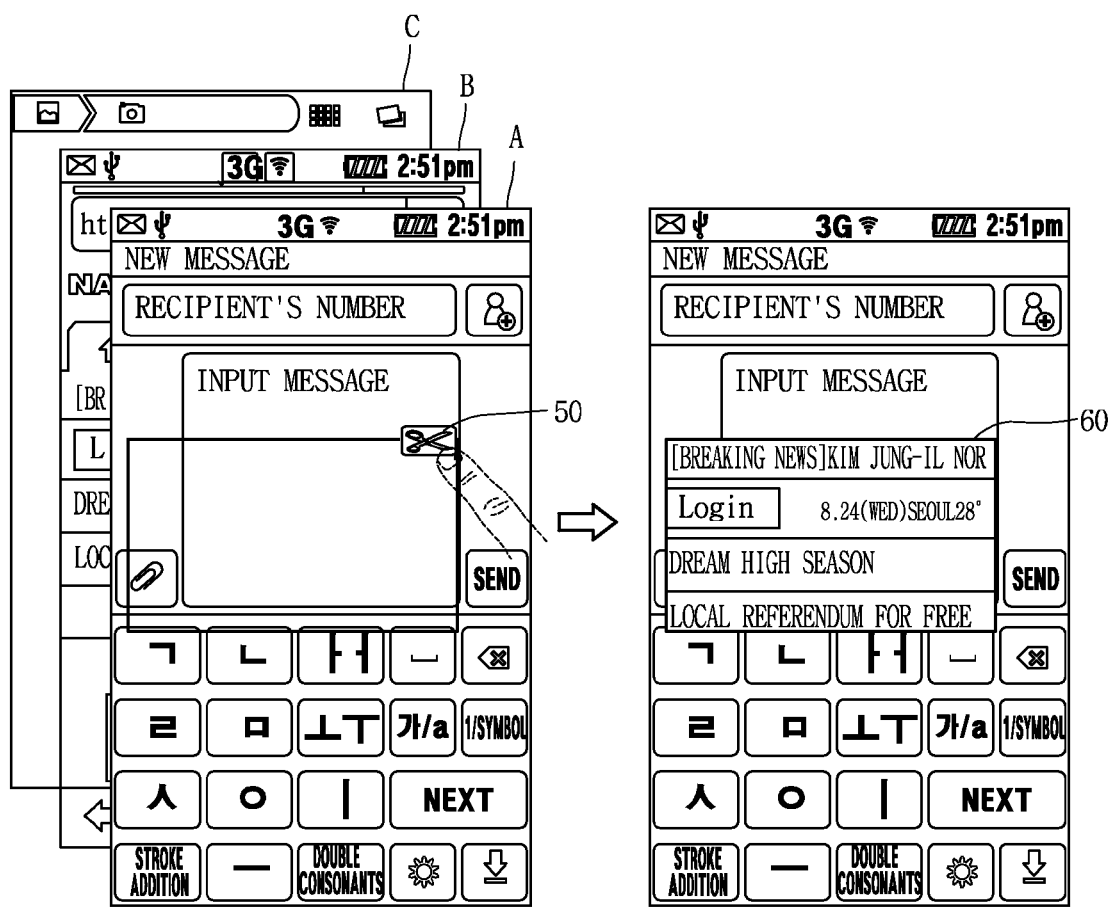
FIG. 3 is a view showing a multitasking method of a mobile terminal according to a first embodiment of the present invention.

FIG. 3 is a view showing a multitasking method of a mobile terminal according to a first embodiment of the present invention.

In the first embodiment, an upper application is cut into a preset shape such that lower applications are visible.

A plurality of layers corresponding to one or more applications are displayed on a screen according to a user's screen setting. That is, the user performs multitasking in a state where a plurality of applications (A~C) are displayed. The upper application (A) is an activated application, which is a message writing screen. And, the lower applications (B and C) are deactivated applications, which are applications associated with a web browser and a camera, respectively.

In case of referring to information of lower applications while inputting a message onto the upper application (A), the user draws a specific shape by moving a scissors icon 50, thereby cutting a required amount of region from the message writing screen (A).

Once a region of a preset shape 60 is cut-out from the message writing screen (A), the user can check content of a lower application through the cut-out region 60 (hereinafter, will be referred to as a search region). However, even if the search region 60 is cut-out from the message writing screen, the user's desired content may not be precisely displayed on the search region 60.

In the present invention, once the search region 60 is created on the message writing screen, a moving mode or a magnifying glass function can be automatically activated according to a user's preset setting. The moving mode is a mode for moving a lower application, and the magnifying glass mode is a mode for enlarging content of the lower application. If the current screen returns to the upper application, the moved application or enlarged content is restored to the original state.

In a state where a plurality of layers corresponding to a plurality of applications are displayed on the screen, if the scissors icon 50 is repeatedly used, even content of a lowermost application is visible through the cut-out plurality of search regions 60.

Displaying Scissors Icon

Figure 4A:
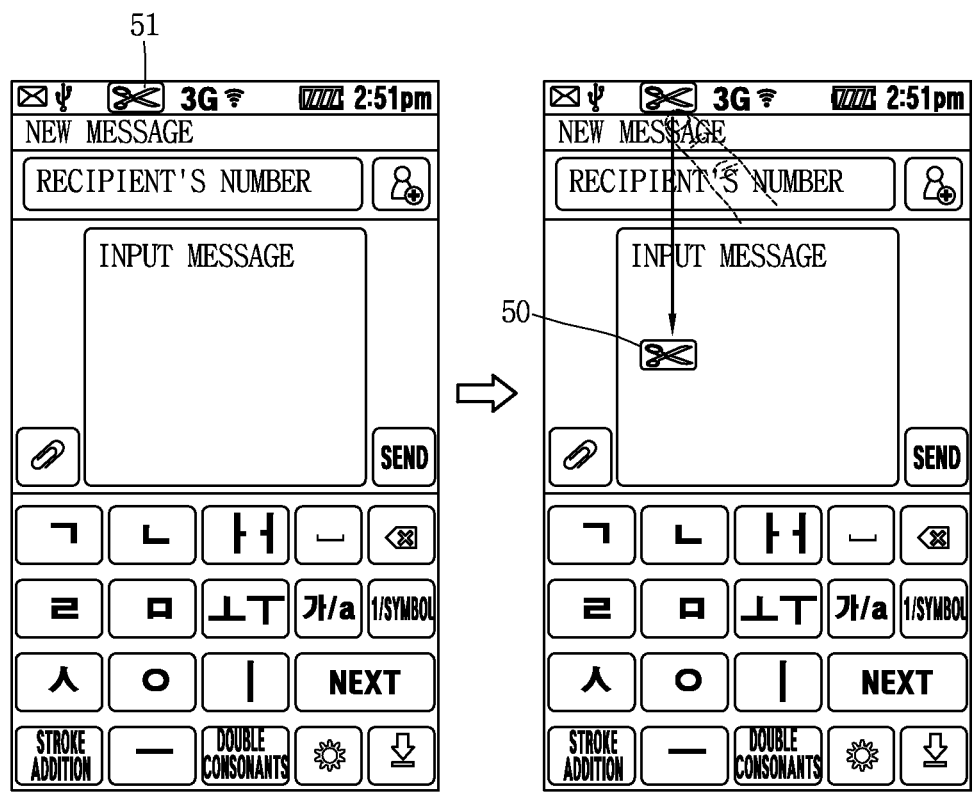
FIGS. 4A and 4B are views showing examples to execute a cutting application.
Figure 4B:
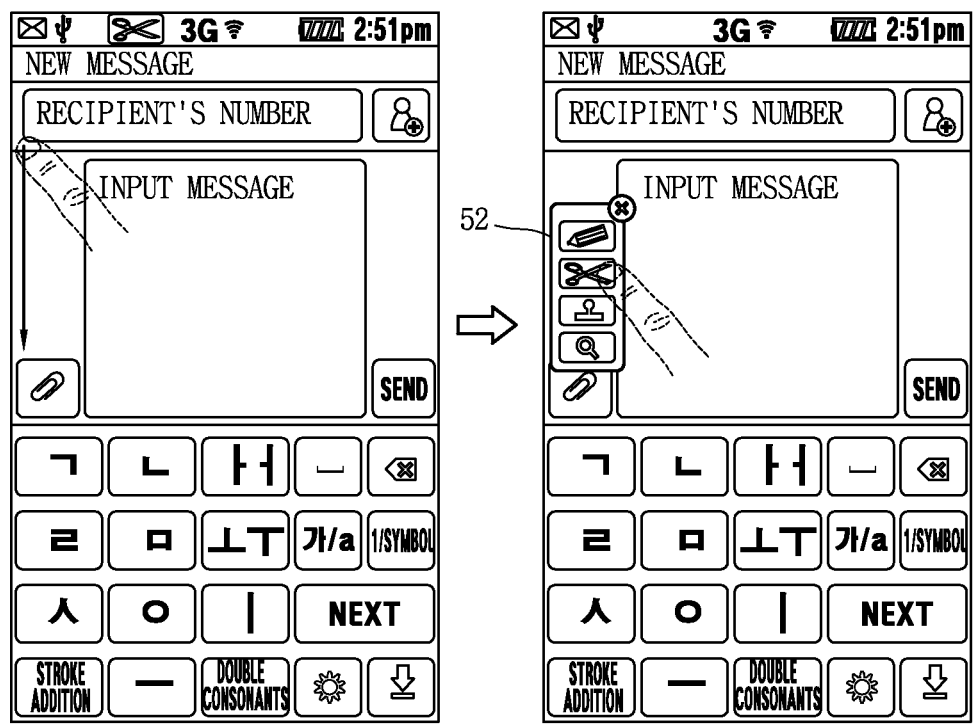

FIGS. 4A and 4B are views showing examples to execute a cutting application.

The method for executing a cutting application in the present invention is largely categorized into two. As shown in FIG. 4A, the first method is a method for displaying the scissors icon 50 on the screen when a scissors display icon 51 is touched on an indicator region thus to be dragged onto the screen. And, as shown in FIG. 4B, the second method is a method for displaying the scissors icon 50 on the screen when a scissors function is selected from a tool bar 52 displayed when a predetermined region on the screen is touched (e.g., moving along the edge of the screen a single time).

Creating Search Region Using Scissors Icon

Figure 5A:
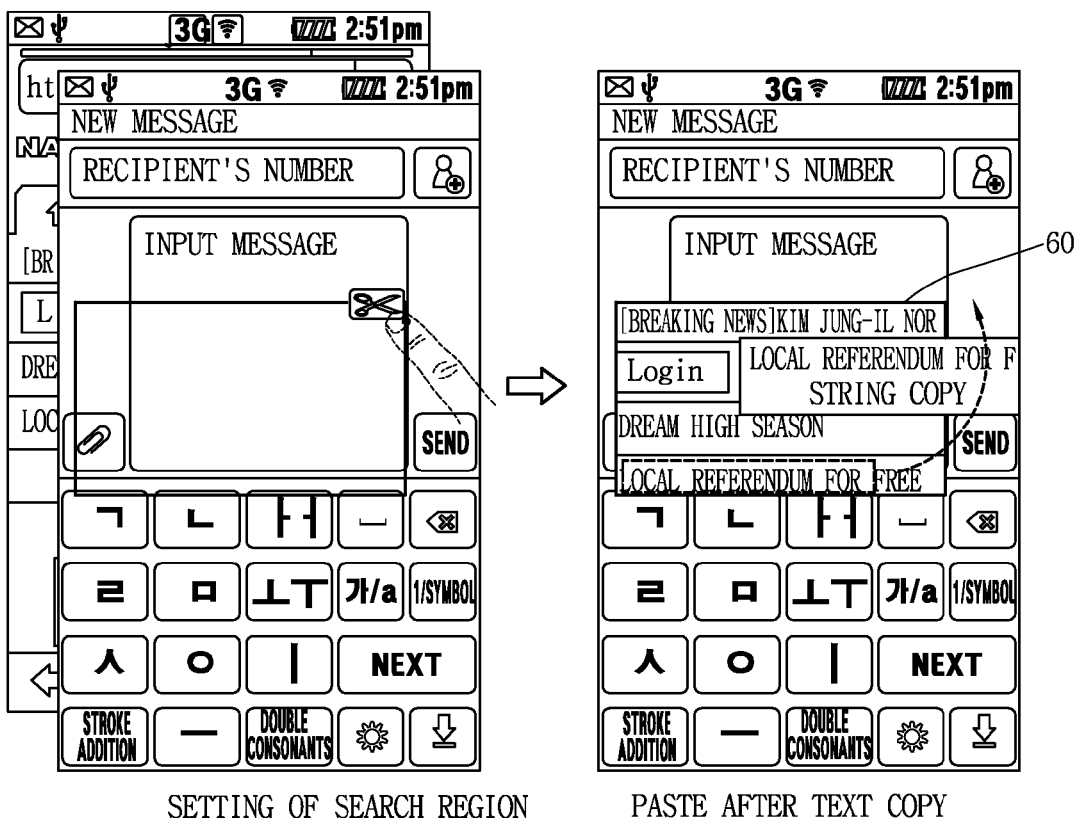
FIGS. 5A and 5B are views showing examples to use content of a lower application through a search region cut by a cutting function.
Figure 5B:
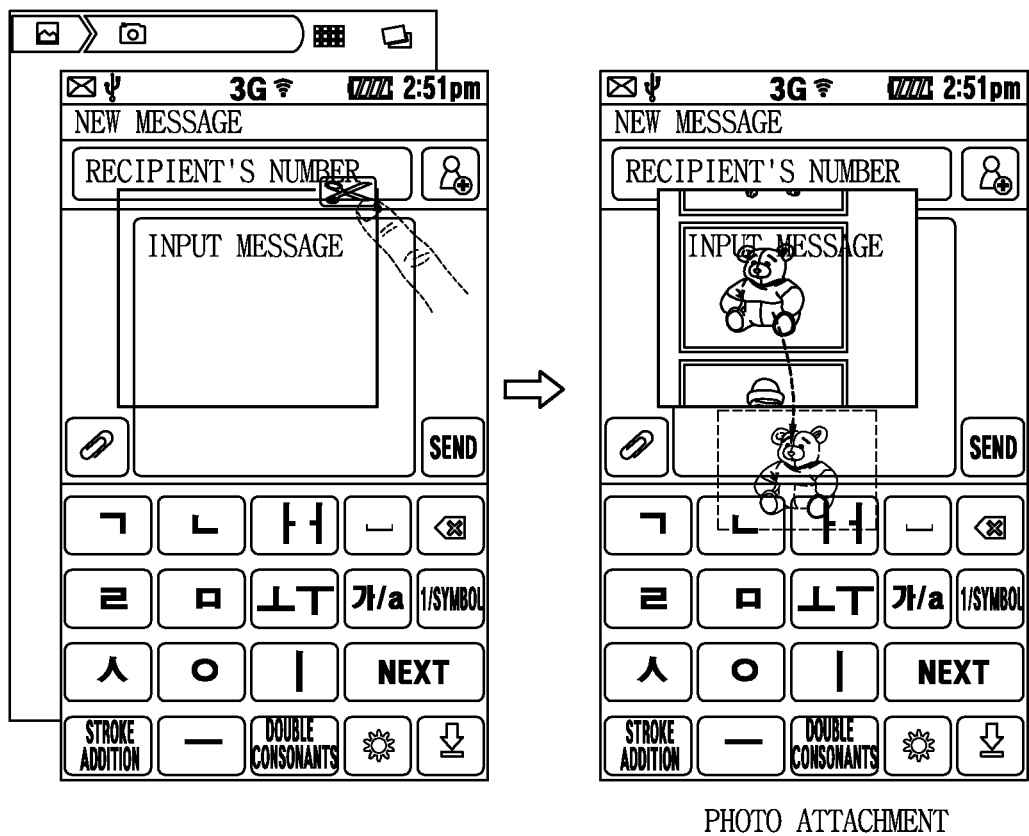

FIGS. 5A and 5B are views showing examples to use content of a lower application through a search region cut by a cutting function.

In a state where a browser screen is displayed as a lower application and a message writing screen is displayed as the upper application, a user inputs a text message on the message writing screen. If the user wishes to refer to content of the browser screen while writing the text message, the user cuts a preset region from the text message by moving the scissors icon 50 as shown in FIG. 5A.

The user can copy his desired string, e.g., a sentence of "local referendum for free lunch" with checking the browser screen through the cut-out search region 60. Then, the user can input (paste) the sentence to the message writing screen on the upper layer.

FIG. 5B is a view showing an example to search for a specific file (e.g., photos) from a lowermost layer, a gallery screen through the search region 60 of the message writing screen, and to attach the searched specific file to a text message. A detailed operation thereof is the same as that of FIG. 5A.

Figure 6:
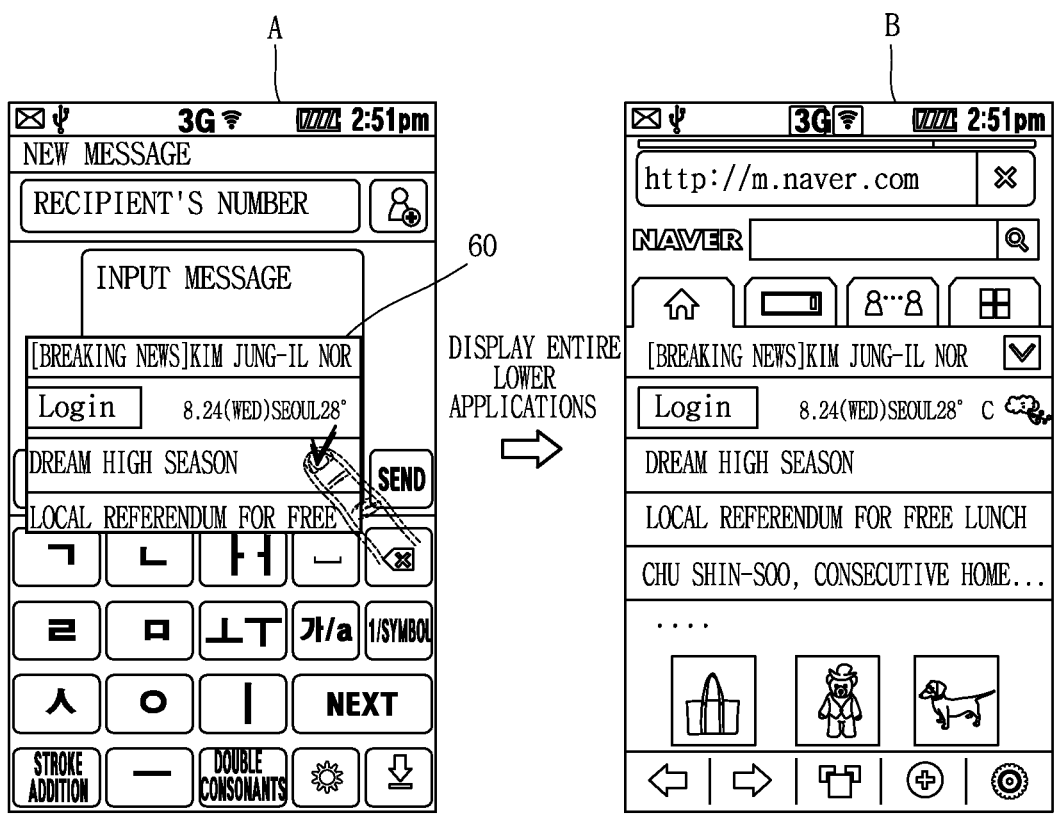
FIG. 6 is a view showing an example to select a lower application through a cut-out search region.

FIG. 6 is a view showing an example to select a lower application through a cut-out search region.

As shown in FIG. 6, only part of a lower application (B) is displayed on the search region 60 cut-out by the scissors icon 50. If a user wishes to view the entire screen of the lower application (B), the user double-touches the search region 60. Upon detection of the double-touch on the search region 60, the controller 180 displays the entire screen of the lower application (B), i.e., the browser screen, on the upper layer. Here, the message writing screen (A), the previous upper layer is deactivated.

Moving Search Region and Controlling Size of the Search Region

In the present invention, the search region 60 cut-out by the scissors icon 50 may be moved or may have a size control according to a touch input. The reason is because the search region 60 cut-out by the scissors icon 50 on the upper application screen is not precisely consistent with a position of an item desired to be viewed by the user on the lower application. So far, it was explained that the lower application is moved through a moving function and a magnifying glass function. However, the present invention is not limited to this. That is, a desired item is visible from the lower application by directly moving the search region 60 or by controlling the size of the search region 60.

Figure 7A:
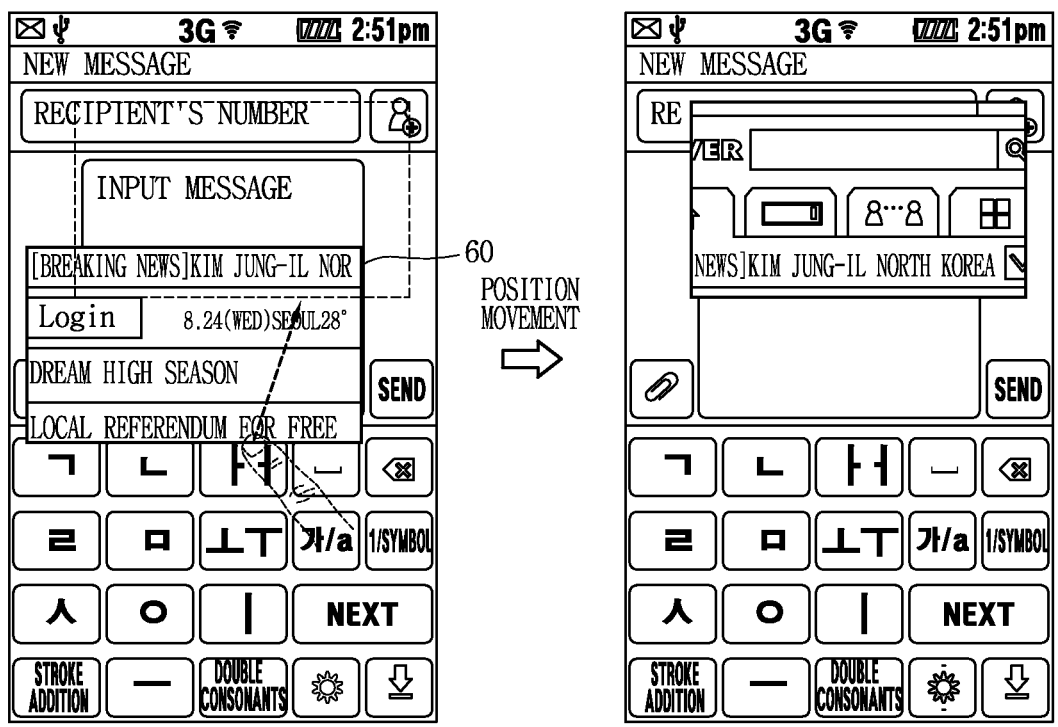

FIGS. 7A and 7B are views showing examples to move a search region or to control a size of the search region on an upper application.

As shown in FIG. 7A, in a state where a user touches the search region 60 cut-out by the scissors icon 50, the user can move the search region 60 in upper and lower directions, and in right and left directions. Once the position of the search region 60 is moved, the user can view another part of the lower application.

As shown in FIG. 7B, in a state where the user touches one side or both sides of the edge of the search region 60, the user may enlarge or contract the search region 60 by inwardly or outward dragging the edge of the search region 60. If the search region 60 is contracted into a size less than a predetermined size by drag, the controller 180 automatically displays only the upper application (A). On the other hand, if the search region 60 is enlarged into a size more than a predetermined size by drag, the controller 180 automatically displays the entire part of the lower application (B).

Touch & drag with respect to the search region 60 can indicate a different command according to a touch position. For instance, in a case where the search region 60 is cut-out in a quadrangular shape, if the corner of the search region 60 is touched and then dragged, the search region 60 can be moved. On the other hand, if the edge of the search region 60 is touched and then dragged, the search region 60 can be enlarged or contracted.

In another embodiment of the present invention, the size of the search region 60 can be controlled by long-touching a specific position on the edge of the search region 60. That is, the size of the search region 60 can be enlarged according to a time duration of long-touch, and can be contracted by multi tap touch.

Releasing Search Region

Figure 8:
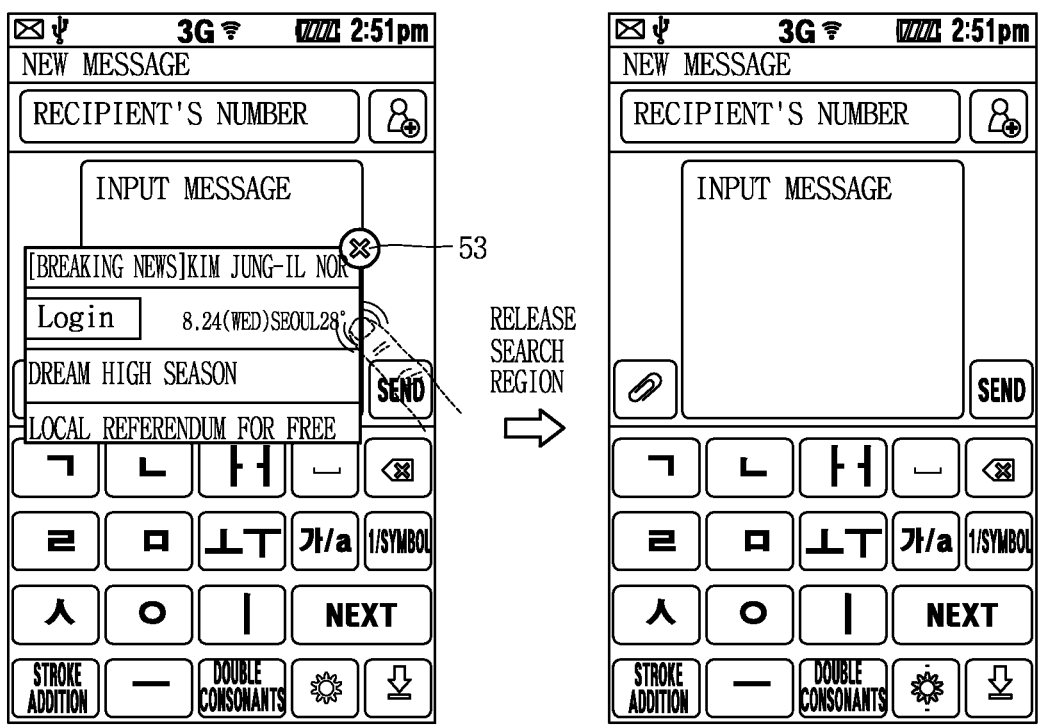
FIG. 8 is a view showing an operation to release a search region created by a scissors icon 50.

FIG. 8 is a view showing an operation to release the search region created by the scissors icon 50.

As shown in FIG. 8, once the edge of the search region 60 is long-touched by a user's finger, a release button 53 is displayed on the edge of the search region 60. This is implemented only when a release button creating function is not activated from a menu. Once the user selects for the release button 53, the search region 60 disappears, and the message writing screen (A) is displayed on the upper layer. However, in a case where a release button creating function is activated from a menu, the release button 53 is automatically created to be displayed, together with a layer icon to be later explained, when the search region 60 is created.

Entering Lowermost Layer

Figure 9:
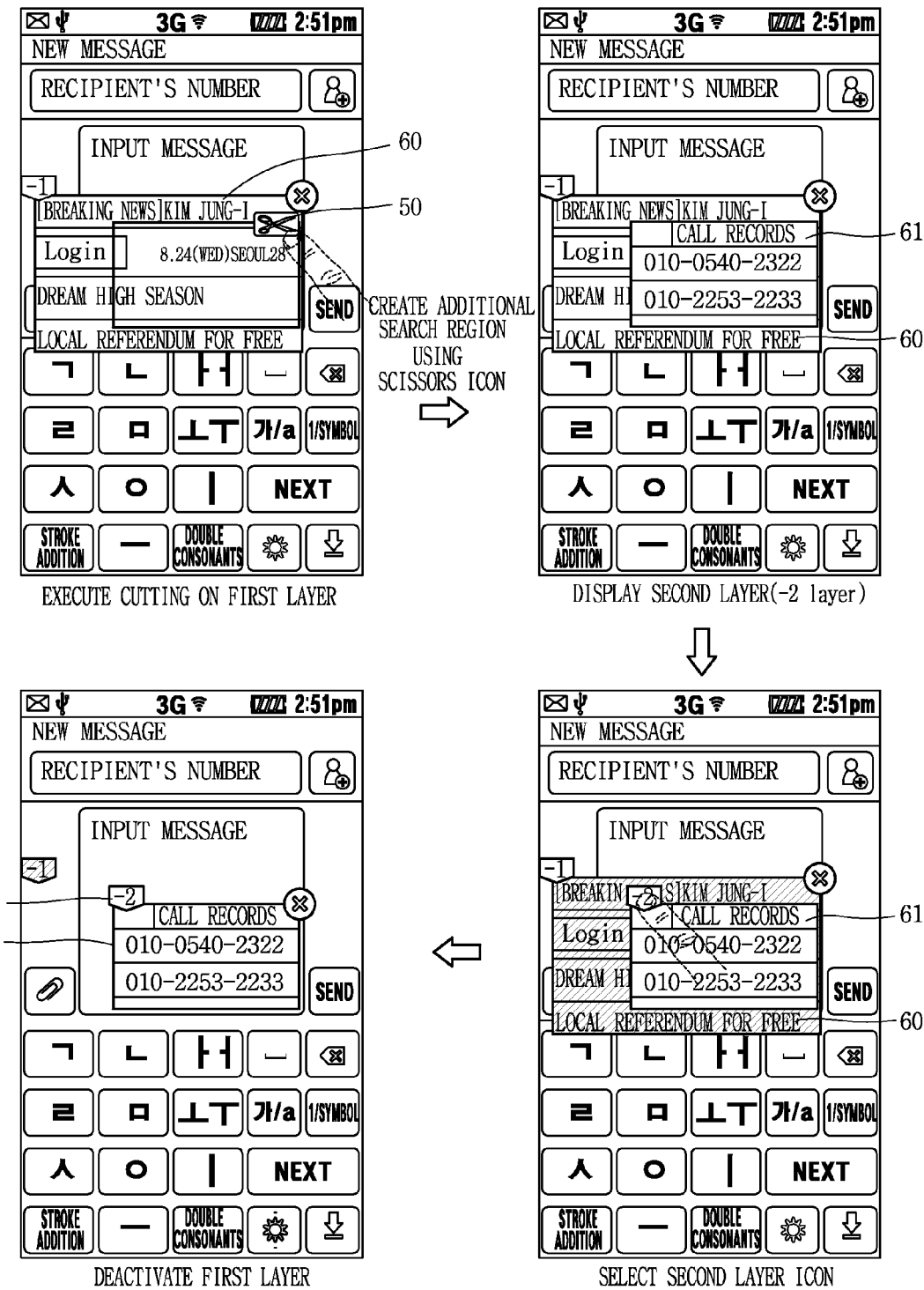
FIG. 9 is a view showing an example to enter a lowermost application through a search region 60.

FIG. 9 is a view showing an example to enter a lowermost application (−2 layer) through the search region 60. In the present invention, applications of three layers were explained. However, the present invention is not limited to this. That is, in a case where three or more layer applications are displayed, the third application is not the lowermost application.

Once the user selects the scissors display icon 51, the controller 180 displays the scissors icon 50 on the search region 60, i.e., on a first lower application (browser screen) (−1 layer). Here, a first layer icon 54 indicating that the current screen has reached up to the first lower application lower than the uppermost layer by one stage (−1 layer), is displayed on the search region 60.

Once the user cuts-out a search region 61 from the first lower application (browser screen) by moving the scissors icon 50 (touch & drag), a browser screen, a second lower layer is displayed through the created search region 61. Upon creation of the search region 61, the controller 180 displays a second layer icon 55 indicating that the current screen has reached up to the second lower layer lower than the uppermost layer by two stages (−2 layer). Since the user can simultaneously view the first and second lower layers from the uppermost layer through the search regions 60 and 61, each application maintains an activated state.

In a state where applications of all layers are in an activated state, if the user selects the second layer icon 55, the controller 180 controls the first lower layer application (browser screen) to disappear, and controls the first layer icon 54 to be changed to a deactivated state.

Figure 10:
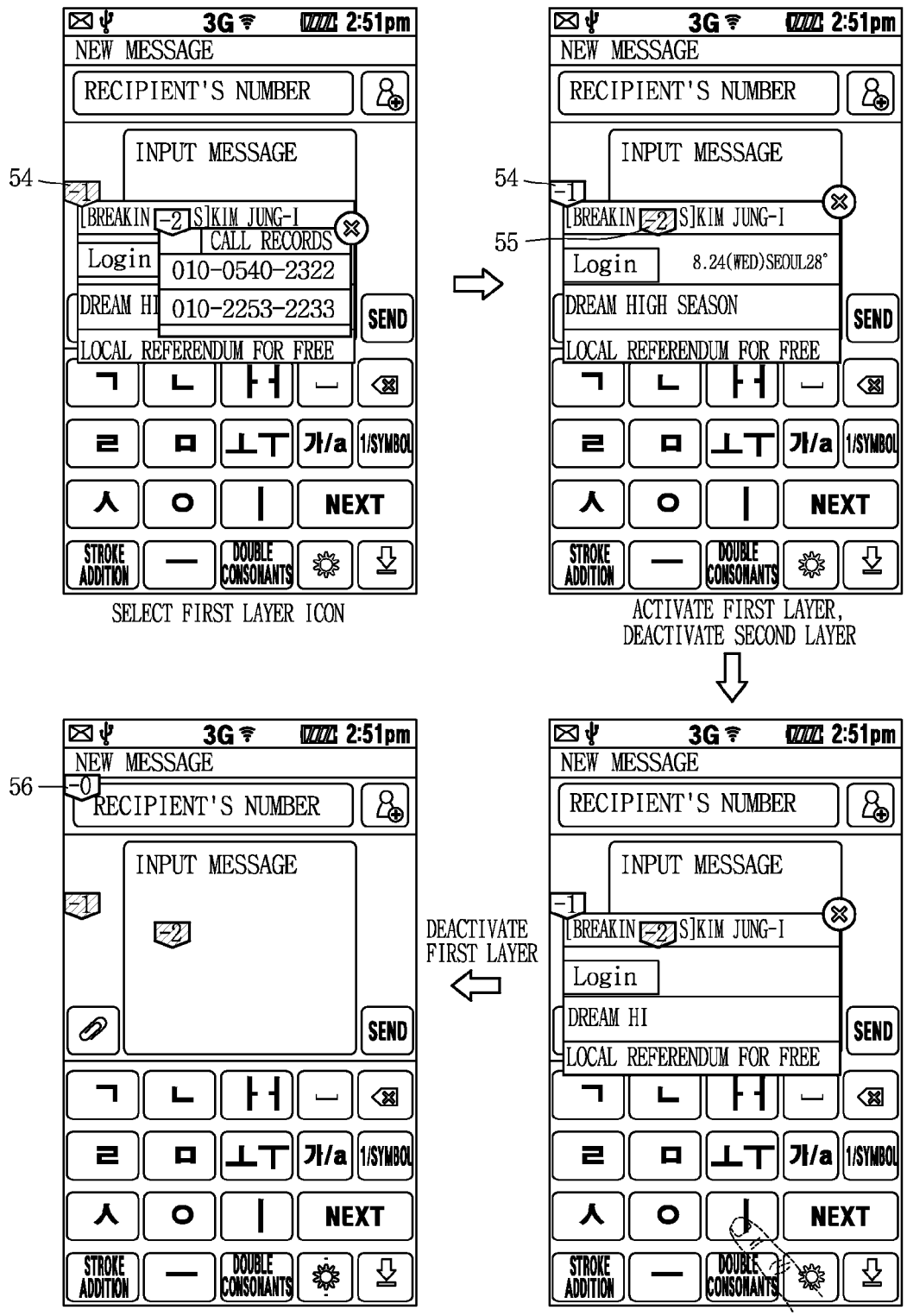
FIG. 10 is a view showing an example to activate/deactivate an application of a specific layer using a layer icon.

FIG. 10 is a view showing an example to activate/deactivate an application of a specific layer using a layer icon.

As shown in FIG. 10, in a state where the first layer icon 54 and the second layer icon 55 have been displayed, if the user selects the first layer icon 54, the controller 180 controls the second lower application to disappear, and controls the second layer icon 55 to be changed into a deactivated state.

In a state where the second layer icon 55 is changed into a deactivated state, if the user selects the uppermost layer (−0 layer), i.e., a message writing screen, the controller 180 controls the first lower layer application (browser screen) to disappear. At the same time, the controller 180 activates an icon 56 indicating the uppermost layer, and changes the first layer icon 54 into a deactivated state.

Referring to FIGS. 9 and 10, once the current screen is sequentially changed into lower layers, icons indicating the corresponding layers are displayed on specific parts (e.g., edge) of the search regions 60. Therefore, when creating the search regions 60 with moving the current screen toward the lower layers, the layer icons are displayed toward the center of the screen in the form of inclined lines as shown in FIG. 10. However, the layer icons displayed in such manner may cause a user to have dispersed feeling. Accordingly, new display methods have been proposed.

Displaying Layer Icons in Various Manners

Figure 11:
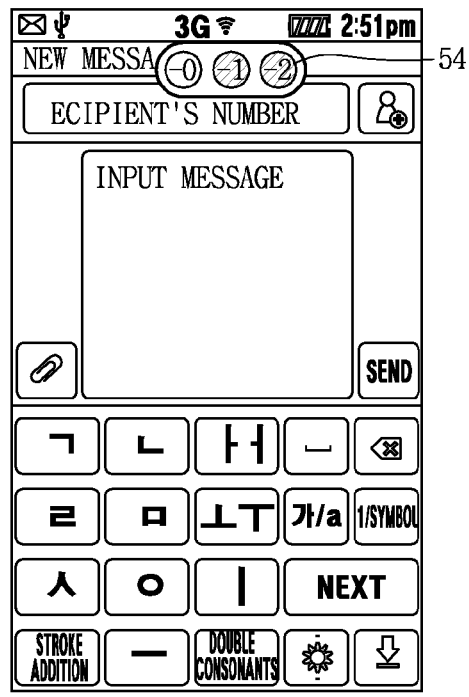
FIGS. 11 and 12 are views showing examples to display a plurality of layer icons.
Figure 12:
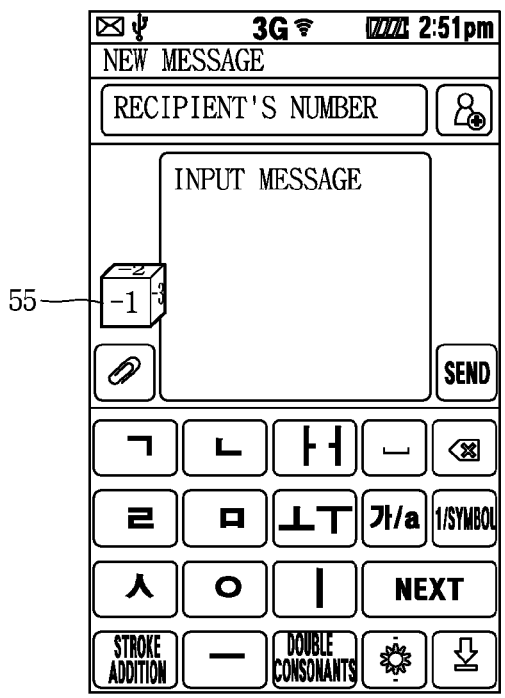

FIGS. 11 and 12 are views showing examples to display a plurality of layer icons.

A plurality of layer icons are displayed on the screen when the search region 60 is created by the scissors icon 50. The corresponding layer icons may be displayed on an additional region, or may be displayed through specific object icons.

As shown in FIG. 11, a plurality of layer icons displayed when the plurality of search regions 60 are created for multitasking, may be displayed within an icon region 54 formed below an indicator region. The layer icons are activated or deactivated according to a user's selection. Referring to FIG. 12, the plurality of layer icons may be displayed on each surface of a rectangular parallelepiped displayed on one side of the screen.

Each layer may not be displayed on the screen as an additional icon, but may be activated or deactivated by being allocated to a shortcut key. For instance, layers may be allocated to "ㄱ", "ㄴ" or "1", "2", and a desired layer may be selected during the operation.

Automatic Position Control of Lower Layer Displayed on Search Region

As aforementioned, the user cuts-out the search region 60 from the upper application into a preset size, in correspondence to a position of information desired to be searched from the lower application. In this case, the user should know in advance precise positions of respective information on a plurality of lower applications, so that desired information (content and items) can be searched within a short time. If the user does not know precise positions of the respective information on a plurality of lower applications, the user should obtain desired information by moving the lower layers through a preset moving function, or by moving the search region 60. However, such methods may cause a difficulty to the user.

Accordingly, the present invention proposes a method for automatically controlling a position of a lower application according to whether the search region 60 has been created or activated.

As an example, a position of the lower application visible through the search region 60 is determined according to a type of the upper application through which the current operation is being performed. For instance, if the user cuts-outs the search region 60 while writing a text message on the upper layer, the controller 180 automatically controls a position of a browser screen (lower layer) so that part of the browser screen (lower layer) including text information can be positioned at a central part of the search region 60. In this state, an additional position control is performed through a moving function, or by moving the search region 60.

As another example, in a case where the user aligns the search region 60 with a specific position of a lower layer desired to be searched, by moving the lower layer or by moving the search region 60, the controller 180 stores a corresponding position (coordinate values). Then, if the corresponding upper layer is deactivated to be re-activated, or if an activated state of the search region 60 is released and then a new cut-out region is created on the upper layer, the controller 180 automatically controls a display position of the lower application based on the stored coordinate values. Here, the controller 180 automatically controls a display position of the lower application, so that content of the previously-searched lower layer can be positioned on a central part of the search region 60.

As still another example, the user can select a menu by aligning the search region 60 with a specific position of a lower layer desired to be searched, by moving the lower layer or by moving the search region 60, and then by touching the edge of the search region 60. If the user selects "storage" from the menu, the controller 180 stores a position of a lower layer corresponding to the search region 60. Upon completion of the storage, the same content is displayed through the search region 60 even if the search region 60 is moved.

FIG. 13 is a view showing an example to display a lower application through a search region.

As shown in FIG. 13, items such as "baseball broadcast screen", "stock market" and "replay bar" are displayed on different positions of a lower application. In this state, if the user wishes to position the items such as "baseball broadcast screen", "stock market" and "replay bar", on the edge of the lower application while viewing the upper application (e.g., naver), the search region 60 should be created in correspondence to the position of the item.

However, since the items are disposed on the user's undesired positions, the user cannot view the items from the edge of the screen even if the search regions 60 are created in correspondence to the positions of the items.

In this case, the user should move the search region 60 into the position where the "baseball broadcast screen" or the "stock market" or the "replay bar" is located, and then store the corresponding position through a menu. In a state where a specific region of the lower layer corresponding to the search region 60 has been stored through the menu, if the search region 60 is moved to the edge of the screen or a new search region is created at the edge of the screen, the controller 180 displays the "baseball broadcast screen" or the "stock market" or the "replay bar" through the search region 60 based on the stored position information. Content of the lower application displayed through the search region 60 is not deactivated, but maintains an activated state even if the upper application is selected. Accordingly, content of the lower applications can be simultaneously viewed while the upper application (e.g., naver) is executed.

Applying Layer Icons

In the present invention, various operations can be performed by using layer icons indicating a plurality of layers. As an example, display positions of a plurality of layer icons displayed on an icon region 54 are changed to change display positions of applications. Alternatively, the layer icons may be made to collide with each other so that a plurality of applications can be simultaneously displayed in the form of divided screens.

Figure 14:
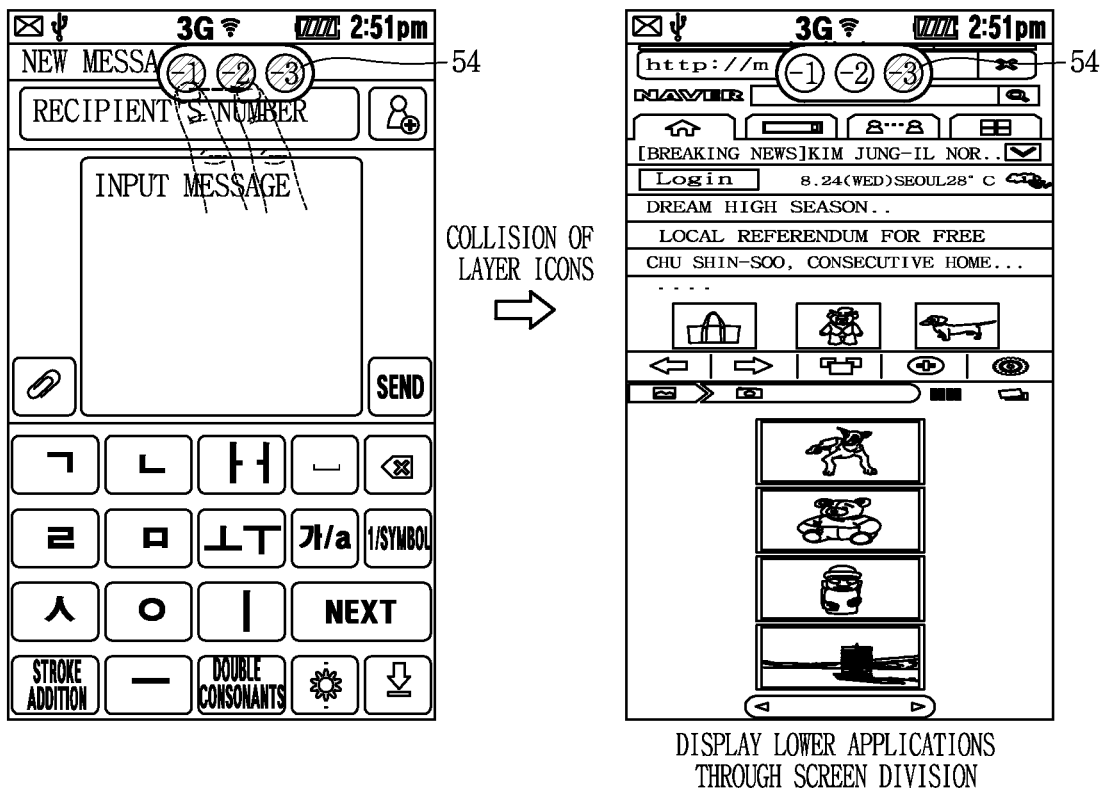
FIG. 14 is a view showing an example to display a screen by collision between layer icons.

FIG. 14 is a view showing an example to display a screen through collision of layer icons.

As shown in FIG. 14, once a user collides a first lower layer (−1 layer) and a second lower layer (−2 layer) displayed on the icon region 54 with each other, the controller 180 simultaneously displays a browser screen (e.g., naver) and a gallery screen by dividing the screen. If the user collides three layer icons with each other, the screen is divided into three regions so that three lower applications are simultaneously displayed on the three regions.

Figure 15:
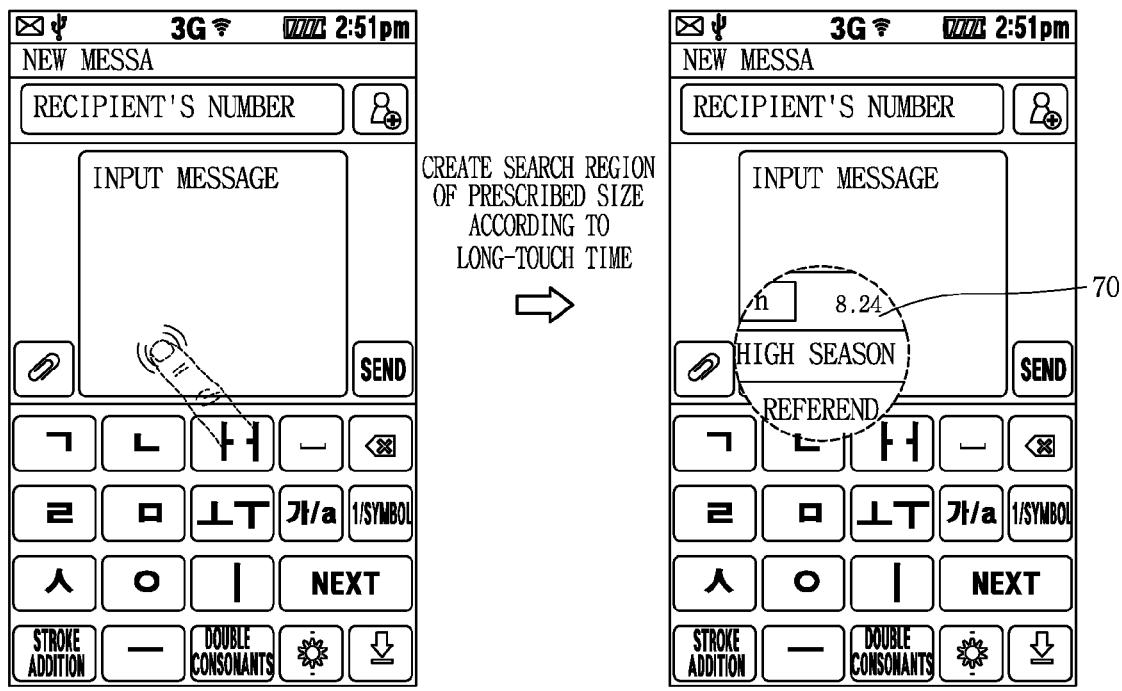
FIG. 15 is a view showing a multitasking method of a mobile terminal according to a second embodiment of the present invention.

FIG. 15 is a view showing a multitasking method of a mobile terminal according to a second embodiment of the present invention. In the second embodiment of the present invention, a search region is created by a spreading effect for access applications of lower layers.

As shown in FIG. 15, once the user long-touches a message writing screen of an upper layer, the controller 180 creates a search region 70 of a circle shape as the upper layer region becomes transparent toward the outside centering around the part touched by the user.

Applications of lower layers are viewed through the search region 70. The size of the search region 70 is determined by a time duration of long touch, and a layer icon and a release button are automatically displayed on the search region 70 once the user's finger is detached from the search region 70.

The search region 70 has a shape different from that of the aforementioned search region 60, but has the same function as the search region 60. Therefore, the current screen can enter at least one lower layer as another search region is formed within the search region 70 by long touch.

Figure 16B:
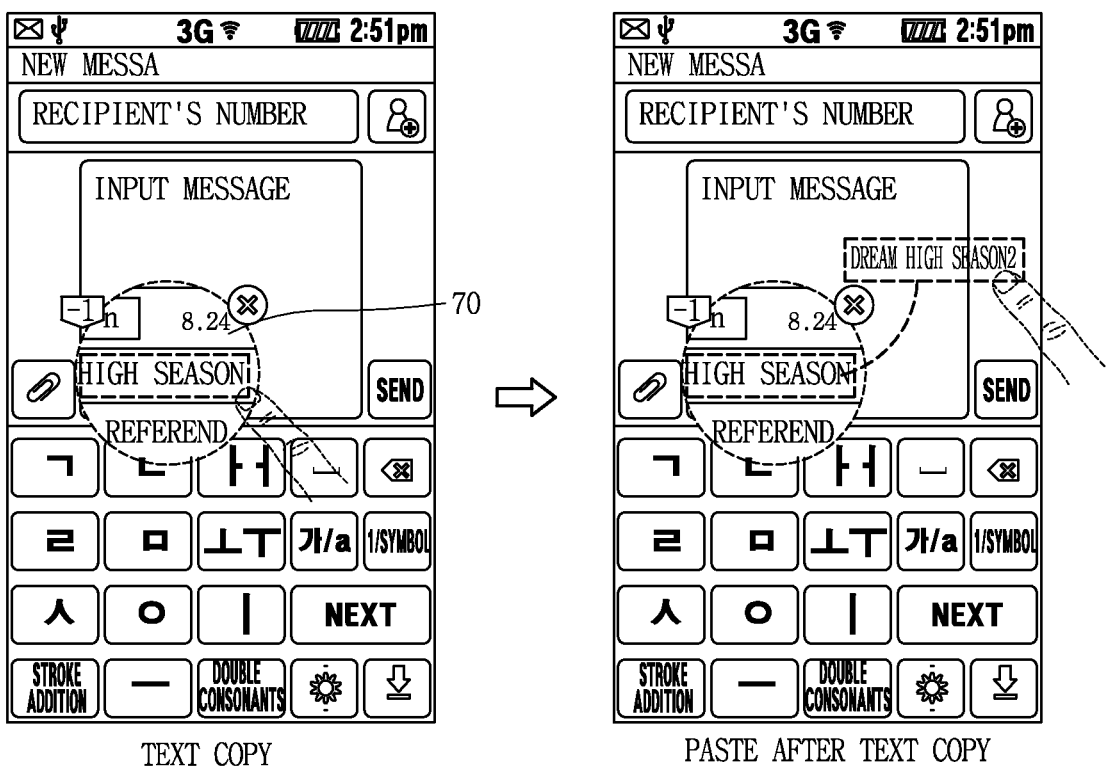

FIGS. 16A and 16B are views showing examples to move the search region 70 created by a spreading effect, and to control the size of the search region 70.

As shown in FIG. 16A, the search region 70 created by a spreading effect can be moved through touch & drag, and can have its size controlled (the same as FIGS. 7A and 7B). As shown in FIG. 16B, the user may copy a specific text from the lower application (e.g., naver) visible through the search region 70, and then may insert the specific text into the upper application (message writing screen) using a paste function (the same as FIG. 5A).

Figure 17:
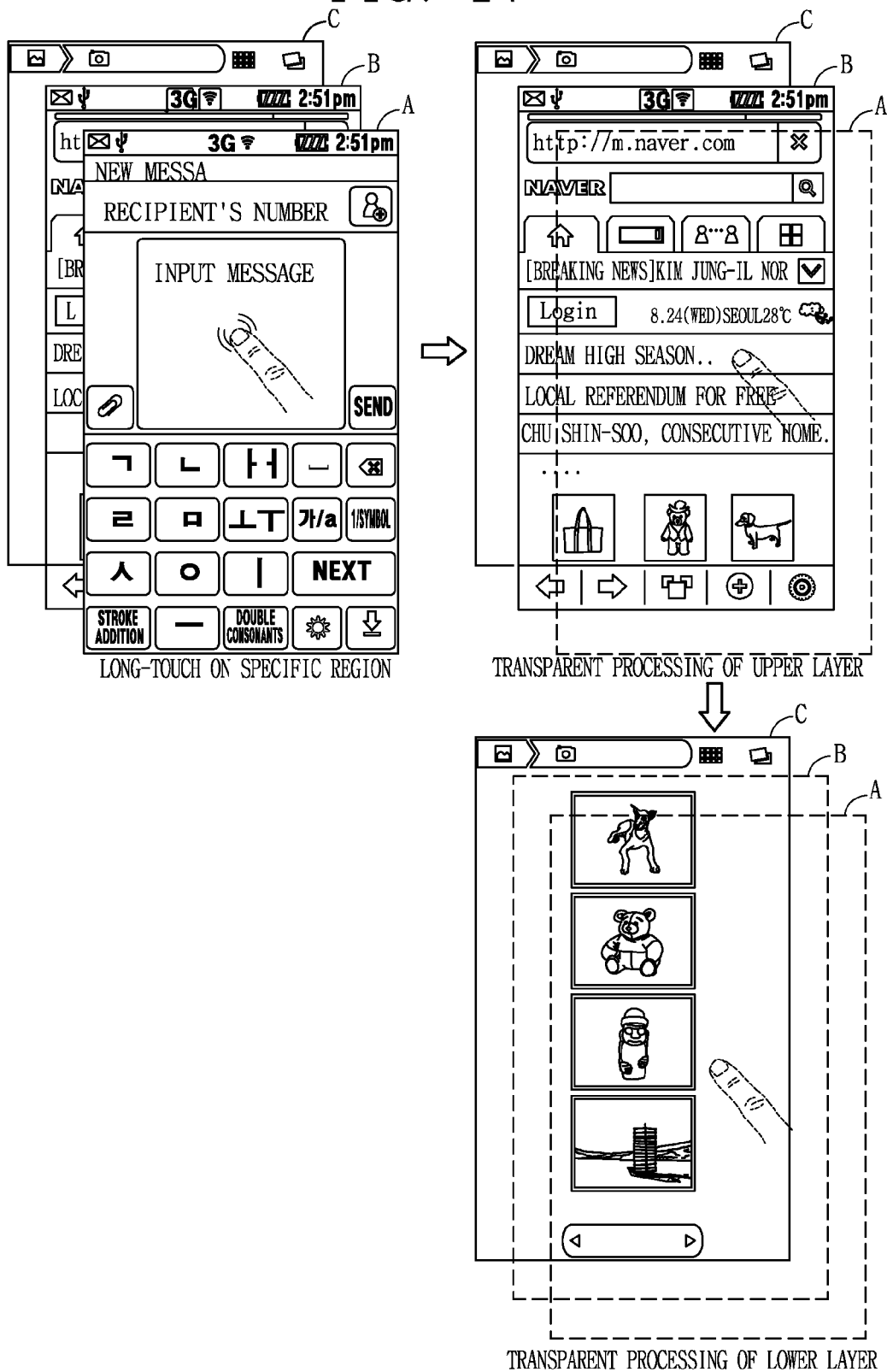
FIG. 17 is a view showing a multitasking method of a mobile terminal according to a third embodiment of the present invention.

FIG. 17 is a view showing a multitasking method of a mobile terminal according to a third embodiment of the present invention. In the third embodiment of the present invention, the current screen enters a lower application from an upper application by a transmission (penetration) effect.

In the third embodiment of the present invention, once a user long-touches a specific region of an upper application (A) as if the user's finger is put into water, the upper application (A) becomes blur as time lapses. As a result, a lower application (B) is visible to allow a lowermost application to be visible.

In such manner, the user searches or copies required information from the lower applications B and C, and uses the information to execute the upper application A.

Figure 18:
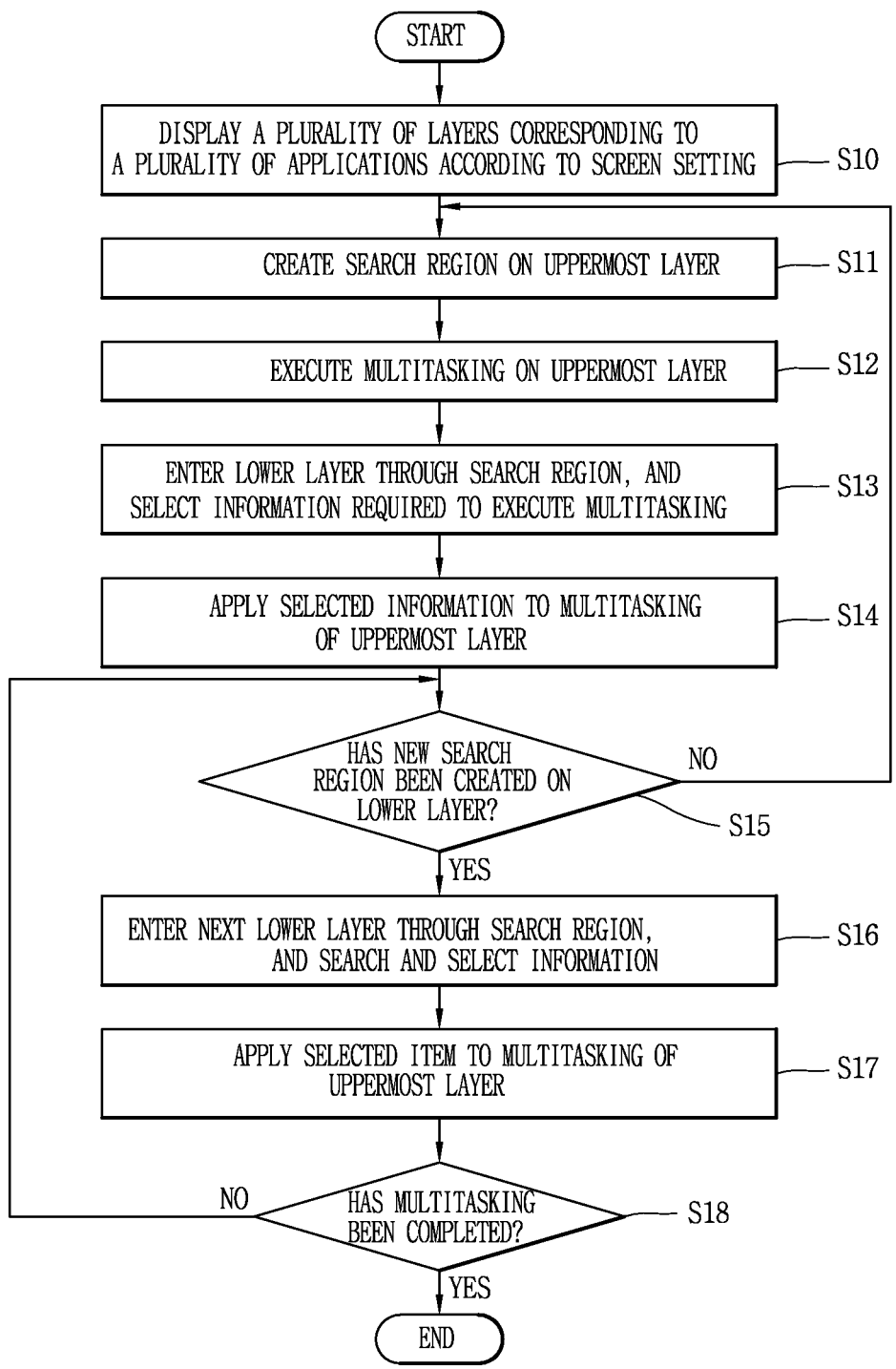
FIG. 18 is a flowchart showing a multitasking method of a mobile terminal according to the present invention.

FIG. 18 is a flowchart showing a multitasking method of a mobile terminal according to the present invention.

As shown in FIG. 18, the controller 180 displays a plurality of layers corresponding to a plurality of applications on the display unit 151 according to a user's screen setting (S10). Here, an application being currently executed is displayed on the uppermost layer.

When writing a text message on the uppermost application, e.g., a message writing screen, the user creates a search region of a preset shape on the message writing screen. Then, the user searches or selects sentences or various types of information required to write the text message, from the lower layer, a browser screen (e.g., naver), through the created search region. Then, the user uses the sentences or information to write the text message (S11~S13).

More specifically, if the user draws a preset shape on the uppermost application using a scissors icon 50, the controller 180 cuts-off the corresponding shape from the message writing screen, thus to create a search region 60. As another example, if the user long-touches the message writing screen, the controller 180 creates a search region 70 by making the screen become gradually transparent by a spreading effect centering around the touched point. The size of the search region 60 is determined by a shape drawn by the scissors icon 50, and the size of the search region 70 is determined by a touch time. The controller 180 displays a release button 53 and a layer icon 54 once the search region 60 or 70 is created.

Once the search region 60 or 70 is created, the controller 180 moves the search region 60 or 70, and controls the size of the search region 60 or 70 (enlarges or contracts) according to a user's touch & drag.

The user can search for or select required information, through the created search region 60 or 70, from the lower application, e.g., the browser screen. And, the selected information is taken out through the search region 60 or 70, and is used to write a text message (S14). When writing a text message using a text message writing screen, the user can search for or select required information (e.g. photos) not only from the lower layer (browser screen), but also from the lowermost layer (gallery screen).

In this case, the user draws a preset shape on the browser screen using the scissors icon 50 or a spreading effect, or long-touches the browser screen for a preset time. The controller 180 creates the search region 60 by cutting-off the corresponding shape from the message writing screen according to the user's touch operation, or creates the search region 70 by making the screen become gradually transparent by a spreading effect centering around the touched point (S15).

Therefore, the user can search for or select required photos through the created search region 60 or 70, from the lower application, e.g., the browser screen. And, the selected information is taken out through the search region 60 or 70, and is used to write a text message (S16, S17).

Upon completion of the multitask operation, the controller 180 completes all the operations. If all the operations are not completed, the current process returns to S15 to check whether a new search region has been created.

Figure 19:
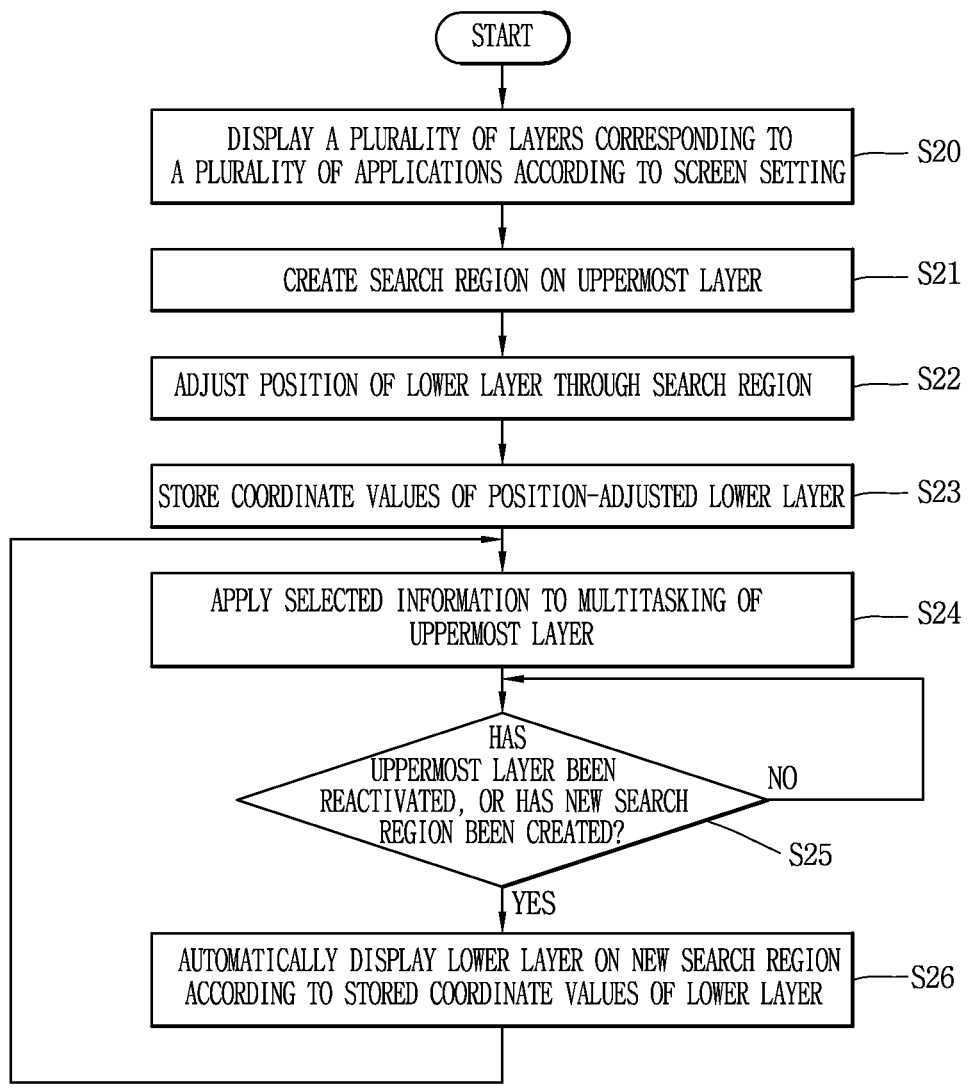
FIG. 19 is a flowchart showing an automatic position control of a lower application displayed through a search region.

FIG. 19 is a flowchart showing an automatic position control of a lower application displayed through a search region.

As aforementioned, the controller 180 displays a plurality of layers corresponding to a plurality of applications on the display unit 151 according to a user's screen setting (S10). Here, an application being currently executed is displayed on the uppermost layer.

In a state where a plurality of layer applications have been displayed on the screen, the user creates a search region 50 on an upper application by a touch operation (S20, S21). If the user moves a lower application in order to search for or select desired information from the lower application through the created search region 50, the controller 180 adjusts the position of the lower application and then stores coordinate values of the adjusted position in the memory 160 (S22, S23). The controller 180 applies the information selected by the user to the uppermost application (S24).

The user can select the lower layer, and display the lower layer on the upper layer. If the lower layer is displayed on the upper layer, the previous application displayed on the uppermost layer is deactivated. If the uppermost layer is activated again in such state, or if a new search region 50 is created on the uppermost application after the activated state of the search region 50 has been completely released (S25), the controller 180 automatically controls the position of the lower application visible through the created search region 50, based on the coordinate values stored in the memory 160, and displays the position (S26).

As aforementioned, in a state where a plurality of layers corresponding to a plurality of applications are displayed on a single screen according to a screen setting, a predetermined operation is performed through the uppermost application. In this case, a hole type search region through which the lower layer can be directly visible is created on the uppermost application. This can allow the user to more rapidly and conveniently search for or select information provided from the lower application, and to apply the information to the uppermost application. As a result, multitasking can be performed more effectively.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of multitasking in a mobile terminal, the method comprising:
displaying a plurality of applications with a hierarchical structure on a screen such that an uppermost application of the plurality of applications is displayed on the screen while executing at least two of the plurality of applications;
creating a first search region on the uppermost application in response to a touch input, the first search region having a preset shape via which a first lower application of the plurality of applications is visible;
automatically moving a position of the first lower application according to a type of the uppermost application when the first search region is created such that the portion of the first lower application having the same type of information as a function performed in the uppermost application is positioned at a central part of the first search region;
accessing the first lower application via the created first search region;
selecting information from the first lower application; and
applying the selected information to the uppermost application.

2. The method of claim 1, wherein the uppermost application is in an activated state and one or more lower applications of the plurality of applications are in a deactivated state.

3. The method of claim 1, wherein the preset shape comprises a hole formed by a cutting function selected via an icon displayed on the uppermost application.

4. The method of claim 1, further comprising:
displaying a plurality of layer icons each corresponding to one of the plurality of displayed applications upon creation of the first search region; and
displaying a plurality of release buttons each configured to release a corresponding one of the plurality of displayed applications.

5. The method of claim 4, wherein each of the plurality of layer icons is displayed on a predetermined region of the first search region, on an additional icon region, or on an object icon.

6. The method of claim 1, wherein the preset shape comprises is a hole that is transparent and centered around a touched point with a spreading effect when a long-touch is received on the uppermost application.

7. The method of claim 1, wherein a size of the created first search region is determined according to either a shape formed by a touch & drag of an icon or a time for which a touch is applied.

8. The method of claim 1, further comprising:
storing a position value of the moved first lower application; and
automatically displaying a previously-searched portion of the first lower application on the first search region according to the stored position value when the uppermost application is re-activated or re-created.

9. The method of claim 8, wherein the first lower application is moved according to a touch input.

10. The method of claim 1, further comprising:
creating a second search region on the first search region, the second search region having a preset shape via which a second subsequently lower application of the plurality of applications is visible;
accessing the second subsequently lower application via the created second search region;
selecting information from the second subsequently lower application; and
applying the selected information to the uppermost application.

11. The method of claim 10, further comprising displaying a plurality of layer icons each corresponding to one of the plurality of displayed applications, the plurality of layer icons displayed upon creation of the second search region and on a predetermined region of the second search region, on an additional icon region or on an object icon.

12. The method of claim 11, further comprising:
receiving a selection of one of the plurality of displayed layer icons;
displaying content of the corresponding displayed application via the second search region; and
displaying the entire corresponding displayed application upon selection of the displayed content.

13. The method of claim 11, further comprising dividing the screen such that corresponding applications of displayed layers are simultaneously displayed if two or more of the plurality of displayed layer icons are moved such that they collide with each other.

14. A mobile terminal, comprising:
a display unit configured to display a plurality of applications, each of the plurality of the application having a corresponding display position;
a memory configured to store the plurality of applications and the display position of the each of the plurality of applications; and
a controller connected to the display unit and the memory and configured to:
control the display unit to display the plurality of applications with a hierarchical structure on a screen of the display unit such that an uppermost application of the plurality of applications is displayed on the screen while executing at least two of the plurality of applications;
control the display unit to create a first search region on the uppermost application in response to a touch input, the first search region having a preset shape via which a first lower application of the plurality of applications is visible;
control the display unit to automatically move a position of the first lower application according to a type of the uppermost application when the first search region is created such that the portion of the first lower application having the same type of information as a function performed in the uppermost application is positioned at a central part of the first search region;
control the display unit to access the first lower application via the created first search region;
receive a selection of information from the first lower application; and
apply the selected information to the uppermost application.

15. The mobile terminal of claim 14, wherein the uppermost application is in an activated state and one or more lower application of the plurality of applications are in a deactivated state.

16. The mobile terminal of claim 14, wherein the preset shape comprises a hole formed by a cutting function selected via an icon displayed on the uppermost application.

17. The mobile terminal of claim 14, wherein the controller is further configured to control the display unit to:
- display a plurality of layer icons each corresponding to one of the plurality of displayed applications upon creation of the first search region; and
- display a plurality of release buttons each configured to release a corresponding one of the plurality of displayed applications.

18. The mobile terminal of claim 17, wherein each of the plurality of layer icons is displayed on a predetermined region of the first search region, on an additional icon region, or on an object icon.

19. The mobile terminal of claim 14, wherein the preset shape comprises a hole that is transparent and centered around a touched point with a spreading effect when a long-touch is received on the uppermost application.

20. The mobile terminal of claim 14, wherein the controller is further configured to determine a size of the created first search region according to either a shape formed by a touch & drag of an icon or a time for which a touch is applied.

21. The mobile terminal of claim 14, wherein the controller is further configured to:
- control the memory to store a position value of the moved first lower application; and
- control the display unit to automatically display a previously-searched portion of the first lower application on the first search region according to the stored position value when the uppermost application is re-activated or re-created.

22. The mobile terminal of claim 21, wherein the controller is further configured to control the display unit to move the first lower application according to a touch input.

23. The mobile terminal of claim 14, wherein the controller is further configured to:
- control the display unit to create a second search region on the first search region, the second search region having a preset shape via which a second subsequently lower application of the plurality of applications is visible; and
- control the display unit to access the second subsequently lower application via the created second search region;
- receive a selection of information from second subsequently lower application; and
- apply the selected information to the uppermost application.

24. The mobile terminal of claim 23, wherein the controller is further configured to control the display unit to display a plurality of layer icons each corresponding to one of the plurality of displayed applications, the plurality of layer icons displayed upon creation of the second search region and on a predetermined region of the second search region, on an additional icon region or on an object icon.

25. The mobile terminal of claim 24, wherein the controller is further configured to control the display unit to divide the screen such that corresponding applications of displayed layers are simultaneously displayed if two or more of the plurality of displayed layer icons are moved such that they collide with each other.

26. The mobile terminal of claim 24, wherein the controller is further configured to:
- receive a selection of one of the plurality of displayed layer icons;
- control the display unit to display content of the corresponding displayed application via the second search region; and
- control the display unit to display the entire corresponding displayed application upon selection of the displayed content.

* * * * *